April 19, 1932.  W. H. KNIGHT  1,854,746

ADJUSTABLE TANGENT FOR GAS METERS

Filed Feb. 18, 1929

Inventor.
William H. Knight
Knox Hudson & Kent
Attys

Patented Apr. 19, 1932

1,854,746

UNITED STATES PATENT OFFICE

WILLIAM H. KNIGHT, OF CLEVELAND, OHIO, ASSIGNOR TO THE CLEVELAND GAS METER COMPANY, OF CLEVELAND, OHIO, A CORPORATION OF OHIO

ADJUSTABLE TANGENT FOR GAS METERS

Application filed February 18, 1929. Serial No. 340,688.

This invention relates to a gas meter and more particularly to the novel construction of the tangent forming one of the meter parts.

An object of the invention is to provide a tangent for a gas meter constructed so that the tangent post may be readily, easily and accurately adjusted either longitudinally of the tangent arm or transversely thereof without the necessity of soldering any of the parts.

Another object is to provide a tangent constructed so that the tangent post may be adjusted longitudinally or transversely of the tangent arm by adjustments entirely independent of each other.

Additional objects and advantages will become apparent as the detailed description of the invention proceeds.

An embodiment of the invention is illustrated in the accompanying drawings, wherein.

Figure 1:
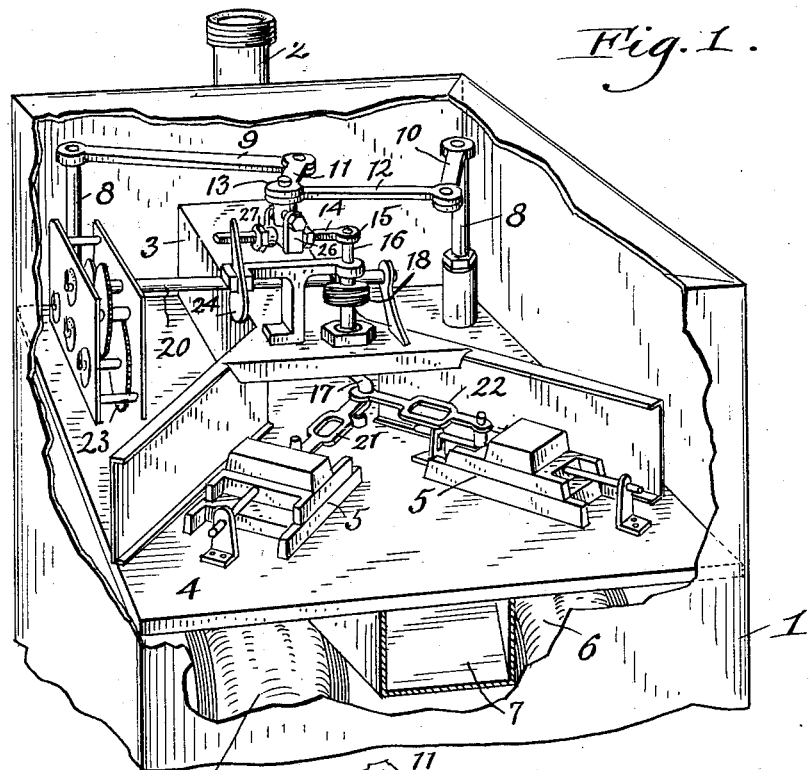
Figure 1 is a fragmentary elevational view of a gas meter, part of the meter casing being broken away, showing the major portion of the meter parts.
Figure 2:
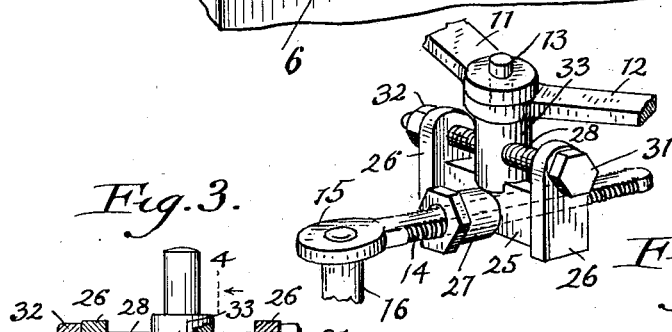
Fig. 2 is a fragmentary enlarged elevational view of a portion of the meter parts.
Figure 3:
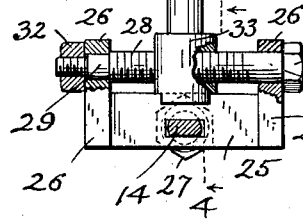
Fig. 3 is an irregular sectional view taken approximately on line 3—3 of Fig. 4.
Figure 4:
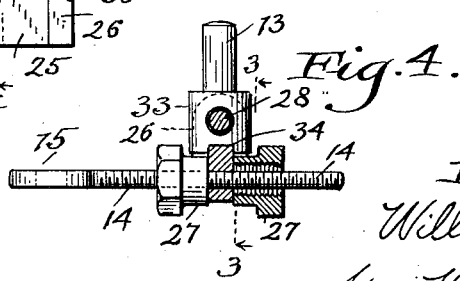
Fig. 4 is an irregular sectional view taken from the front approximately on line 4—4 of Fig. 3.

The meter construction shown herein, with the exception of the tangent, is conventional and well understood in the art and need only be described briefly for that reason.

The meter comprises the usual case 1, inlet 2, channel 3, partition or table 4 for the meter parts, sliding valves 5, diaphragms 6, and outlet 7. It is well understood in the art the valves 5 are so arranged that the diaphragms 6 will be alternately expanded and contracted by the gas flowing through the meter, which expansion and contraction of the diaphragms will oscillate the vertically arranged shafts 8 operatively connected with each diaphragm.

Flag arms 9 and 10 are fixedly secured respectively at one end to the upper end of the shafts 8, while the other end of the flag arms 9 and 10 are pivotally connected in a well known manner to flag arm links 11 and 12. The ends of these flag arm links are pivotally connected with the tangent post 13 of the tangent, which post is adjustably carried by the tangent arm 14 in a manner to be more fully explained hereinafter. The tangent arm 14 has an enlarged eye 15 formed at one end thereof within which is fixedly secured the upper end of a vertically disposed shaft 16 having a crank portion 17 adjacent its lower end and a worm 18 intermediate the crank portion 17 and the upper end of the shaft, which worm meshes with a gear carried by the horizontally arranged index shaft 20 which operates the index or register. Links 21 and 22 are connected at one end to the crank portion 17 of the shaft 16 and at the other end are pivotally connected to the valves 5.

The mechanism just described is well understood in the art and it will be sufficient to say, for the purpose of this application, that as the shafts 8 oscillate the flag arms 9 and 10 are oscillated and this movement in turn is imparted through the flag arm links 11 and 12 to the tangent arm 14 in the form of a rotative movement of the latter. Rotation of the tangent arm in turn rotates the shaft 16, the crank portion 17 thereof operating the slide valves 5, while the worm 18 carried thereby meshes with the gear on the index shaft 20, rotating said shaft and actuating the index or registering mechanism 23. A pivoted pawl 24 is arranged in the path of rotative movement of the outer end of the tangent arm and serves the purpose of preventing reverse rotation of said arm, the pawl assuming the position shown in Fig. 1 by gravity.

It is often desirable to adjust the tangent post longitudinally of the tangent arm for the purpose of increasing or decreasing the stroke of the diaphragms. It is also desirable or necessary at times to adjust the tangent post transversely of the tangent arm for the purpose of timing the valves with the stroke of the diaphragms. Heretofore these adjustments have necessitated the separation of parts which are soldered together, or the tangents have been so constructed that the two adjustments can not be made independently of one another and require a large amount of skill as well as difficulty in procuring the necessary accuracy.

The tangent shown herein and now about to be described permits of ready, accurate and easy adjustment of the tangent post both longitudinally of the tangent arm and transversely thereof, such adjustments being accomplished entirely independently of one another.

The tangent arm 14 is of the usual construction in that it is substantially oval in cross section and is screw threaded for a part of its length on the two narrow sides thereof. It is proposed to mount on this tangent arm a transversely extending bar member 25 having a vertically extending arm 26 at each of its ends. The bar 25 is provided with a centrally arranged opening through which the tangent arm may extend of such size that while the bar will have a close fit upon the arm, it will still be free to slide thereon. The bar is held in adjusted position upon the tangent arm by threaded adjusting bushings 27, one of such bushings being arranged on the tangent arm on each side of the bar. One of the arms 26 is provided near its upper end with a circular opening, the center of which is in alignment with the center of a smaller circular opening arranged in the other of the arms 26. These openings form a bearing support for an adjusting screw 28, such screw being provided with smooth portions 29 and 30 fitting the small and large circular openings in the arms, respectively, while between the portions 29 and 30 is arranged a threaded portion. The end of the adjusting screw adjacent the smooth portion 30 is provided with a hexagonal or other shaped head 31, while the end thereof adjacent the portion 29 is threaded to receive a locking nut 32. The tangent post 13 is carried by an enlarged cylindrical follower member 33, integral with or secured to the lower end of the post, and having a transversely extending centrally arranged threaded bore therein cooperating with the threaded portion of the adjusting screw 28. The lower end of the follower member 33 is provided with a notch 34 extending transversely of the member and in vertical alignment with the threaded bore therein. When the tangent is assembled the follower is threaded upon the adjusting screw 28 while the notch 34 in the bottom thereof straddles the upper side of the bar 25 and serves to positively guide and support the follower as it is adjusted transversely of the tangent arm.

It will be clear that when it is desired to adjust the tangent post longitudinally of the tangent arm for the purpose of increasing or decreasing the stroke of the diaphragm it will only be necessary to loosen the adjusting bushings 27 and to slide the bar longitudinally of the arm the desired amount after which the bushings may be tightened. When it is desired to adjust the tangent post transversely of the bar for the purpose of timing the valves with the stroke of the diaphragms it will only be necessary to turn the adjusting screw 28 which will cause the follower 33 carrying the post 13 to move in the desired direction transversely of the tangent arm. These two adjustments are entirely independent of one another, may be performed without the necessity of any soldering operations, and are effected by a minimum number of adjustments.

Although a preferred embodiment of the invention has been illustrated and described herein, it should be understood that the invention is susceptible of various modifications and adaptations within the scope of the appended claims.

Having thus described my invention, I claim:

1. A tangent for a gas meter comprising a tangent arm, a bar arranged transversely of said arm and having an opening therein through which said arm extends, said bar having portions at its opposite ends provided with aligned bearing openings, a tangent post, a follower associated with said post and having one end provided with a central groove extending longitudinally of said bar and straddling an edge thereof, and means rotatably mounted in the aligned bearing openings in the portions at the opposite ends of the bar and engaging said follower whereby rotation of said means causes said follower to be adjustably moved longitudinally of the bar.

2. A tangent for a gas meter comprising a threaded tangent arm, a bar arranged transversely of said arm and having an opening therein through which said arm extends, adjusting nuts arranged on said arm on each side of said bar whereby said bar may be adjusted longitudinally of said arm, said bar having upwardly extending portions at its opposite ends provided with aligned bearing openings, a tangent post, a follower associated with said post and having one end provided with a central groove extending longitudinally of said bar and straddling an edge thereof, said post being provided with a threaded opening aligned with and parallel to said groove, and an adjusting screw rotatably arranged in said bearing openings at the opposite ends of the bar and extending through said threaded opening in the follower whereby the latter may be adjustably moved longitudinally of the bar.

In testimony whereof, I hereunto affix my signature.

WILLIAM H. KNIGHT.